(12) United States Patent
Hwang et al.

(10) Patent No.: US 10,195,831 B2
(45) Date of Patent: Feb. 5, 2019

(54) ADHESIVE FILM AND METHOD OF MANUFACTURING THE SAME AND DISPLAY DEVICE INCLUDING THE ADHESIVE FILM

(71) Applicant: SAMSUNG DISPLAY CO., LTD., Yongin, Gyeonggi-Do (KR)

(72) Inventors: Hyeon-Deuk Hwang, Yongin (KR); Dong-Hyuk Lim, Seoul (KR); Myung-Jae Jung, Seoul (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 1172 days.

(21) Appl. No.: 14/145,311

(22) Filed: Dec. 31, 2013

(65) Prior Publication Data

US 2015/0010766 A1    Jan. 8, 2015

(30) Foreign Application Priority Data

Jul. 3, 2013 (KR) .................. 10-2013-0077910

(51) Int. Cl.
  *B32B 27/32* (2006.01)
  *B32B 38/00* (2006.01)
  (Continued)

(52) U.S. Cl.
  CPC ............... *B32B 27/32* (2013.01); *B32B 7/12* (2013.01); *B32B 37/223* (2013.01); *B32B 38/0004* (2013.01); *C09J 4/00* (2013.01); *B32B 2038/0076* (2013.01); *B32B 2038/042* (2013.01); *B32B 2305/74* (2013.01); *B32B 2307/412* (2013.01);
  (Continued)

(58) Field of Classification Search
  CPC ......... B32B 27/32; B32B 7/12; B32B 37/223; B32B 38/0004; C09J 4/00
  USPC ..................................... 156/275.5
  See application file for complete search history.

(56) References Cited

U.S. PATENT DOCUMENTS 6,323,436 B1 * 11/2001 Hedrick ............... H01L 23/145
                                                    174/255
6,372,074 B1 * 4/2002 Holguin .............. B29C 63/0017
                                                    156/234

(Continued)

FOREIGN PATENT DOCUMENTS

EP        2053087        4/2009
JP      2004-281526     10/2004
(Continued)

OTHER PUBLICATIONS

Appln. No. WO 2010061761 corresponds to KR1020110097759.
Appln. No. EP 2053087 corresponds to KR1020110087349.

*Primary Examiner* — Michael N Orlando
*Assistant Examiner* — Elizabeth Bradford
(74) *Attorney, Agent, or Firm* — F. Chau & Associates, LLC

(57) ABSTRACT

Disclosed is a method of manufacturing an adhesive film including: preparing a transparent adhesion layer, disposing a film mask including a light-transmitting region and a light-shielding region on the transparent adhesion layer, applying ultraviolet (UV) light to the transparent adhesion layer through the film mask to precure an area of the transparent adhesion layer corresponding to the light-transmitting region of the film mask, and cutting the precured area of the transparent adhesion layer.

13 Claims, 13 Drawing Sheets

(51) Int. Cl.
  *B32B 7/12* (2006.01)
  *B32B 37/22* (2006.01)
  *C09J 4/00* (2006.01)
  *B32B 38/04* (2006.01)
  *C08L 33/08* (2006.01)
  *C08F 222/10* (2006.01)

(52) U.S. Cl.
  CPC ... *B32B 2310/0831* (2013.01); *B32B 2405/00* (2013.01); *B32B 2457/20* (2013.01); *C08F 2222/1013* (2013.01); *C08F 2222/1086* (2013.01); *C08L 33/08* (2013.01); *Y10T 156/1052* (2015.01); *Y10T 428/31938* (2015.04)

(56) References Cited

U.S. PATENT DOCUMENTS

| | | | |
|---|---|---|---|
| 7,273,530 B2 * | 9/2007 | Flosbach | B29C 35/0805 156/230 |
| 2012/0312776 A1 * | 12/2012 | Cheng | G06F 3/045 216/20 |

FOREIGN PATENT DOCUMENTS

| | | |
|---|---|---|
| KR | 1020110087349 | 8/2011 |
| KR | 1020110097759 | 8/2011 |
| KR | 1020110119347 | 11/2011 |
| WO | 2010061761 | 6/2010 |

\* cited by examiner

ADHESIVE FILM AND METHOD OF MANUFACTURING THE SAME AND DISPLAY DEVICE INCLUDING THE ADHESIVE FILM

CROSS-REFERENCE TO RELATED APPLICATIONS

This application claims priority to Korean Patent Application No. 10-2013-0077910 filed on Jul. 3, 2013, the entire disclosure of which is hereby incorporated by reference herein in its entirety.

1. TECHNICAL FIELD

An adhesive film, a method of manufacturing the same, and a display device including the adhesive film are disclosed.

2. DISCUSSION OF THE RELATED ART

Currently known display devices include, for example, a liquid crystal display (LCD), a plasma display panel (PDP), an organic light emitting diode display (OLED), a field effect display (FED), an electrophoretic display device, and the like.

Such a display device includes a display module displaying an image and a window protecting the display module. The display panel and the window are generally combined by, for example, an optically clear adhesive (OCA).

As the optically clear adhesive is generally coated in the form of a film, bubble may be generated in a stepped region, or waving may be generated by shrinking of a base layer. Accordingly, the optically clear adhesive may need to have characteristics of low modulus and high flexibility. However, when using the optically clear adhesive having low modulus and high flexibility, the incision cross-sectional surface of optically clear adhesive may not be smooth, and the adhesive residue may be smeared outside of the product to thereby deteriorate workability.

SUMMARY

Exemplary embodiments provide a method of manufacturing an adhesive film which increases workability in the forming process.

Exemplary embodiments provide an adhesive film manufactured according to the method.

Exemplary embodiments provide a display device including the adhesive film.

According to an exemplary embodiment, provided is a method of manufacturing an adhesive film including: preparing a transparent adhesion layer, disposing a film mask including a light-transmitting region and a light-shielding region on the transparent adhesion layer, applying ultraviolet (UV) light to the transparent adhesion layer through the film mask to precure an area of the transparent adhesion layer corresponding to the light-transmitting region of the film mask, and cutting the precured area of the transparent adhesion layer.

The film mask may include a light-blocking printed layer and a release layer formed on a substrate layer; and the light-blocking printed layer may be formed on all areas of the transparent adhesion layer except for a place corresponding to the area where the transparent adhesion layer is to be cured.

The place corresponding to the area where the transparent adhesion layer is to be cured may be formed with a closed curved line.

The preparing of the transparent adhesion layer may include laminating an optically clear adhesive in a semisolid at a room temperature.

The optically clear adhesive may include an acrylic copolymer obtained from a composition including a solution-polymerizable acryl compound and a reaction initiator, and an ultraviolet (UV) curable compound.

The solution-polymerizable acryl compound may include at least one selected from the group consisting of acrylic acid, 2-ethylhexyl acrylate, 2-methylbutyl acrylate, isooctyl acrylate, lauryl acrylate, ethyl acrylate, butyl acrylate, hexyl acrylate, octyl acrylate, decyl acrylate, and isodecyl acrylate.

The solution-polymerizable acryl compound may include about 30 to about 60 wt % of butyl acrylate, about 30 to about 60 wt % of 2-ethylhexyl acrylate, and about 0.1 to about 40 wt % of acrylic acid.

The reaction initiator may include at least one selected from the group consisting of benzoylperoxide, acetyl peroxide, dilauryl peroxide, hydrogen peroxide, potassium persulfonate, and 2,2'-azobisisobutyronitrile.

The ultraviolet (UV) curable compound may include at least one selected from the group consisting of caprolactone acrylate, 1,6-hexanediol diacrylate, trimethylolpropane triacrylate, pentaerythritol triacrylate, lauryl acrylate, urethane acrylate, epoxy acrylate, polyester acrylate, and silicon acrylate.

The ultraviolet (UV) curable compound may include about 5 to about 50 wt % of trimethylolpropane triacrylate, about 5 to about 50 wt % of multi-functional urethane acrylate, and about 5 to about 50 wt % of 1,6-hexadiol diacrylate.

The optically clear adhesive may further include a photoinitiator.

The acrylic copolymer and the ultraviolet (UV) curable compound may be included at a weight ratio of about 70:30 to about 95.5:0.5.

The disposing of the film mask; the precuring of the transparent adhesion layer, and the cutting of the precured area of the transparent adhesion layer may be performed in an in-line process.

According to an embodiment, an adhesive film manufactured according to the method is provided.

According to an embodiment, a display device includes display panel, a window positioned on the display panel, and the adhesive film interposed between the display panel and window.

In accordance with an exemplary embodiment, a method of manufacturing an adhesive film is provided. The method includes disposing a first transparent adhesion layer including an optically clear adhesive which is in a semisolid state at room temperature on an upper surface of a light shielding substrate, disposing a second transparent adhesion layer including an optically clear adhesive which is in a semisolid state at room temperature on a lower surface of the light shielding substrate, disposing a first film mask including a light-transmitting region and a light-shielding region on the first transparent adhesion layer disposed on the upper surface of the light shielding substrate, disposing a second film mask including a light-transmitting region and a light-shielding region on the second transparent adhesion layer disposed on the lower surface of the light shielding substrate, applying ultraviolet (UV) light to the first transparent adhesion layer through the light-transmitting region of the first film mask disposed on the upper surface of the light shielding substrate to precure an area of the first transparent adhesion layer corresponding to the light-transmitting region of the first film mask, applying ultraviolet (UV) light to the second transparent adhesion layer through the light-transmitting region of the second film mask disposed on the lower surface of the light shielding substrate to precure an area of the second transparent adhesion layer corresponding to the light-transmitting region of the second film mask, cutting the precured area of the first transparent adhesion layer, and cutting the precured area of the second transparent adhesion layer, thereby forming a first adhesive film on the upper surface of the light shielding substrate and a second adhesive film on the lower surface of the light shielding substrate.

By previously precuring the cut region of transparent adhesion layer, the modulus and the hardness of transparent adhesion layer may be increased, so as to prevent the optically clear adhesive from being smeared to a cutter and also preventing the optically clear adhesive residue from being smeared outside of the product. Accordingly, the workability of the process for forming the adhesive film may be increased.

BRIEF DESCRIPTION OF THE DRAWINGS

Exemplary embodiments of the present invention can be understood in more detail from the following detailed description taken in conjunction with the accompanying drawings, in which.

DETAILED DESCRIPTION OF EXEMPLARY EMBODIMENTS

Figure 1:
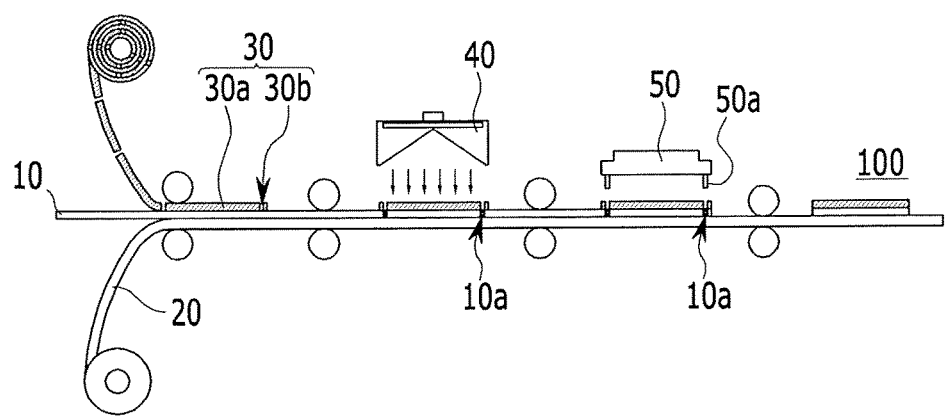
FIG. 1 is a schematic view showing a method of manufacturing an adhesive film according to an embodiment.

Hereinafter, exemplary embodiments will hereinafter be described in detail so that a person skilled in the art would understand. However, this disclosure may, however, be embodied in many different forms and is not construed as limited to exemplary embodiments set forth herein.

In the drawings, the thickness of layers, films, panels, regions, etc. may be exaggerated for clarity. Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

Hereinafter, a method of manufacturing an adhesive film according to an embodiment is described with reference to the drawings.

FIG. 1 is a schematic view showing a method of manufacturing an adhesive film according to an embodiment.

The method of manufacturing an adhesive film 100 according to an embodiment includes, for example: preparing a transparent adhesion layer 10, disposing a film mask 30 including a light-transmitting region 30b and a light-shielding region 30a on the transparent adhesion layer 10, applying ultraviolet (UV) light to the transparent adhesion layer 10 through the film mask 30 to precure an area of the transparent adhesion layer 10 which corresponds to the light-transmitting region of the film mask 30, and cutting the precured region 10a of the transparent adhesion layer 10.

First, a transparent adhesion layer 10 is prepared.

The transparent adhesion layer 10 may include, for example, an optically clear adhesive in a semisolid state at room temperature. The semisolid refers to a state of between liquid state and solid state and may have a storage modulus of, for example, about $10^3$ Pa to about $10^6$ Pa at room temperature.

Figure 4:
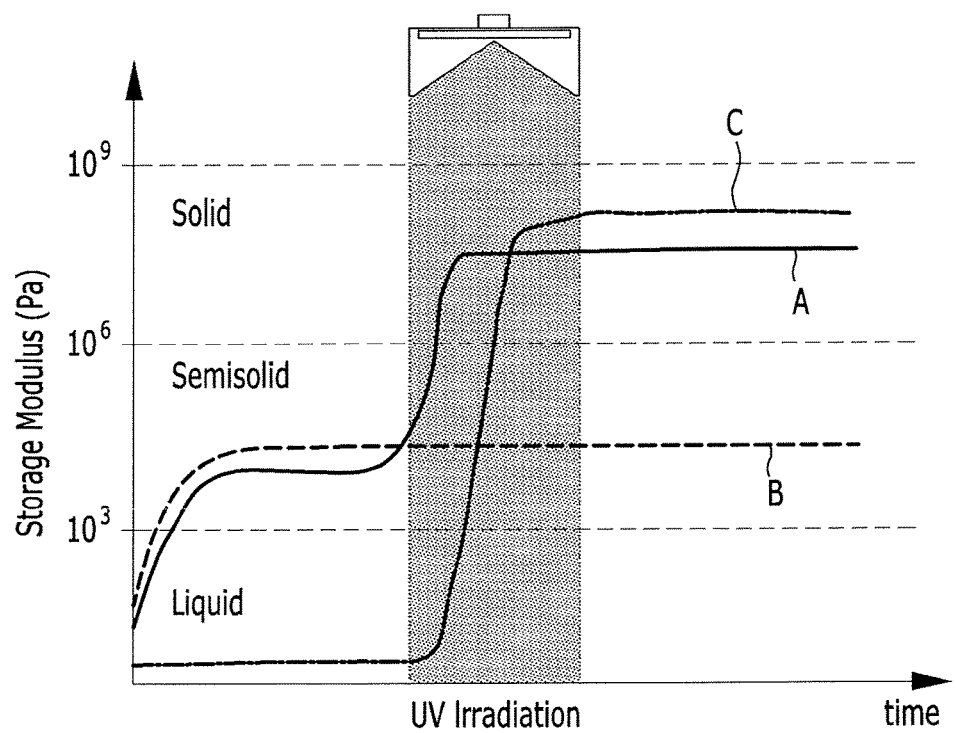
FIG. 4 is a graph showing a storage modulus of the optically clear adhesive used in a method of manufacturing an adhesive film according to an embodiment.

FIG. 4 is a graph showing a storage modulus of an optically clear adhesive used in a method of manufacturing an adhesive film according to an embodiment.

Referring to FIG. 4, the optically clear adhesive may be present, for example, in a semisolid state having a storage modulus of about $10^3$ Pa to about $10^6$ Pa at room temperature (25° C.), and the phase may be rapidly transferred into a solid state having a storage modulus of no less than about $10^6$ Pa by being irradiated with ultraviolet light (A). The optically clear adhesive is different from the pressure sensitive adhesive (PSA) (B) which is maintained in a semisolid state even after being irradiated with ultraviolet light. The UV-curable resin (C) is present in a liquid state having a storage modulus of no greater than about $10^3$ Pa at room temperature and is phase-transferred into a solid state having a storage modulus of no less than about $10^6$ Pa by being irradiated with UV light.

The optically clear adhesive may include, for example, an acrylic copolymer obtained from a composition including a solution-polymerizable acryl compound and a reaction initiator, and an ultraviolet (UV) curable compound.

The solution-polymerizable acryl compound may be, for example, a compound that is solution-polymerized to have an adhesive property, and may be, for example acrylic acid, 2-ethylhexyl acrylate, 2-methylbutyl acrylate, isooctyl acrylate, lauryl acrylate, ethyl acrylate, butyl acrylate, hexyl acrylate, octyl acrylate, decyl acrylate, isodecyl acrylate, or a combination thereof.

The solution-polymerizable acryl compound may include, for example, butyl acrylate, ethyl acrylate, and acrylic acid. For example, in an exemplary embodiment, the solution-polymerizable acryl compound may include about 30 to about 60 wt % of butyl acrylate, about 30 to about 60 wt % of 2-ethylhexyl acrylate, and about 0.1 to about 40 wt % of acrylic acid based on the total amount of the solution-polymerizable acryl compound.

The reaction initiator may be, for example, a thermal initiator, and the thermal initiator may be decomposed by, for example, heating to provide a radical and to initiate a synthesis reaction by the radical. The thermal initiator may be, for example, benzoylperoxide, acetylperoxide, dilauryl peroxide, hydrogen peroxide, potassium persulfonate, 2,2'-azobisisobutyronitrile (AIBN), 1,1'-azo-bis(cyclohexanecarbonitrile), 2,2'-azobis(2,4-dimethylvaleronitrile), 2,2'-azobis (methyl-butyro-nitrile), lauroyl peroxide, tert-butyl peroxide, tert-butyl hydroperoxide, azo-tert-butane, azo-normal-butane, tert-butyl peracetate or a combination thereof, but exemplary embodiments are not limited thereto.

The reaction initiator may be included in, for example, about 0.1 to 15 parts by weight based on 100 parts by weight of the solution-polymerizable acryl compound.

The acrylic copolymer may have a weight average molecular weight of, for example, about 200,000 to about 1,500,000, but exemplary embodiments are not limited thereto.

The acrylic copolymer may be, for example, a pressure sensitive adhesive (PSA).

The ultraviolet (UV) curable compound is, for example, a compound that is curable by an ultraviolet (UV) light, and may be, for example, caprolactone acrylate, 1,6-hexanediol diacrylate, trimethylolpropane triacrylate, pentaerythritol triacrylate, lauryl acrylate, urethane acrylate, epoxy acrylate, polyester acrylate, silicon acrylate, pentaerythritol tetraacrylate, HEBDM (bis(hydroxyethyl)bisphenol-A dimethacrylate), dipentaerythritol hexaacrylate, ethoxylated bisphenol A diacrylate, or a combination thereof.

The ultraviolet (UV) curable compound may include, for example, trimethylolpropane triacrylate, urethane acrylate, and 1,6-hexadiol diacrylate, and may include, for example, about 5 to about 50 wt % of trimethylolpropane triacrylate, about 5 to about 50 wt % of multi-functional urethane acrylate, and about 5 to about 50 wt % of 1,6-hexadiol diacrylate based on the total amount of the ultraviolet (UV) curable compound.

The acrylic copolymer and the ultraviolet (UV) curable compound may be included at, for example, a weight ratio of about 70:30 to about 95.5:0.5. By including the acrylic copolymer and the ultraviolet (UV) curable compound within the above weight ratio range, the ultraviolet (UV) curing may be efficiently performed while ensuring the adhesive property.

The optically clear adhesive may further include, for example, a photo-initiator. The photo-initiator may be decomposed by light to generate a radical and may initiate a reaction by the radical. The photo-initiator may be, for example, an acetophenone-based compound. For example, in an embodiment, the acetophenone-based compound can be one of 2,2'-diethoxy acetophenone, 2,2'-dibuthoxy acetophenone, 2-hydroxy-2-methyl propiophenone, p-t-butyl-trichloroacetophenone, p-t-butyldichloroacetophenone, 4-chloroacetophenone, 4,4'-dimethylaminobenzophenone, 4,4'-dichlorobenzophenone, 3,3'-dimethyl-2-methoxybenzophenone, 2'2-dichloro-4-phenoxyacetophenone, 2-methyl-1-(4-(methylthio)phenyl)-2-morpholinopropane-1-one and 2-benzyl-2-dimethylamino-1-(4-morpholinophenyl)-butane-1-one.

The photo-initiator may be included, for example, in about 0.1 to about 5 parts by weight based on 100 parts by weight of the ultraviolet (UV) curable compound.

The transparent adhesion layer 10 may be formed by, for example, laminating the optically clear adhesive.

Then a film mask 30 is disposed, for example, on one side of transparent adhesion layer 10.

Figure 2:
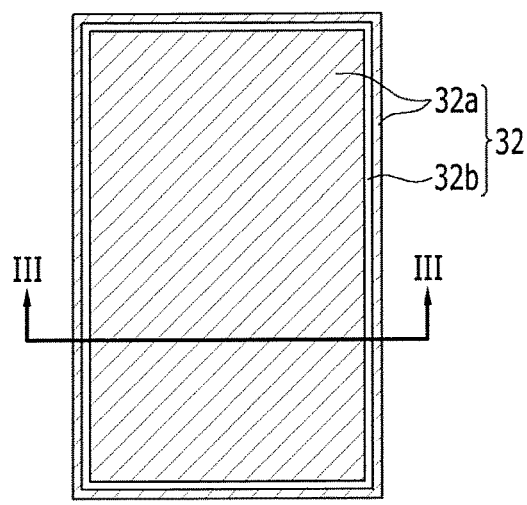
FIG. 2 is a top plan view showing a film mask used in a method of manufacturing an adhesive film according to an embodiment.
Figure 3:
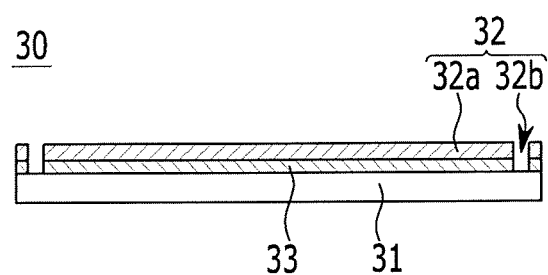
FIG. 3 is a cross-sectional view cut by a III-III line of FIG. 2.

FIG. 2 is a top plan view showing a film mask used in the method of manufacturing an adhesive film according to an embodiment and FIG. 3 is a cross-sectional view cut along with a III-III line of FIG. 2.

Referring to FIG. 2 and FIG. 3, the film mask 30 includes, for example, a light-blocking printed layer 32 formed on a substrate layer 31.

The substrate layer 31 may be, for example, a transparent substrate. For example, in an embodiment, the substrate layer 31 may be, a transparent film made of a thermoplastic or thermosetting resin such as polycarbonate (PC), polymethylmethacrylate (PMMA), polystyrene (PS) or a copolymer thereof, polyethyleneterephthalate (PET), polyethylenenaphthalate (PEN), polyethersulfone (PES) or a copolymer thereof and the like, or an inorganic layer such as glass. In addition, in an embodiment, substrate layer 31 may be made of a transparent film including, for example, triacetyl cellulose (TAC); a polyester resin, a polyethersulfone resin, a polysulfone resin, a polyamide resin, a polyimide resin, a polyolefin resin, an acrylic resin, a polynorbornene resin, a cellulose resin, a polyallylate resin, a polyvinyl alcohol resin, a polyacrylic resin, and a mixture thereof.

A release layer 33 is attached on the substrate layer 31.

The light-blocking printed layer 32 may include, for example, a material blocking light such as black ink, and the region provided with the light-blocking printed layer 32 provides a light-shielding region 32a. The light-blocking printed layer 32 may be formed on all areas of the film mask 30 except for a place corresponding to the area where the transparent adhesion layer 10 is to be cured by ultraviolet (UV) light.

The area of the film mask 30 where the light-blocking printed layer 32 is not formed corresponds to the area where the transparent adhesion layer 10 is to be cured by ultraviolet (UV) light in a process described later herein. For example, the place corresponding to the area where the transparent adhesion layer 10 is to be cured by ultraviolet (UV) light may be formed in a closed curve such as circle, oval, and polygon. The area of film mask 30 where the light-blocking printed layer 32 is not formed provides a light-transmitting region 32b.

The other surface of transparent adhesion layer 10 may be protected by, for example, a release paper 20.

Then, an ultraviolet (UV) supplier 40 is disposed on the film mask 30 and supplies ultraviolet (UV) light onto the transparent adhesion layer 10. Ultraviolet (UV) light may be shielded by the light-shielding region 30a of film mask 30 but may be supplied to the transparent adhesion layer 10 through the light-transmitting region 30b. Thereby, the transparent adhesion layer 10 may be precured along with the shape of light-transmitting region 30b of film mask 30. For example, when the light-transmitting region 30b has a closed curved shape, the precured region 10a in the transparent adhesion layer 10 may also have the closed curved shape.

Then, for example, a cutter 50 is disposed on the transparent adhesion layer 10. The cutter 50 includes, for example, a cutting part 50a, and the cutting part 50a is disposed to correspond to the precured region 10a of transparent adhesion layer 10. Subsequently, a surface of cutter 50 is pressed to cut the precured region 10a of transparent adhesion layer 10.

As described above, the transparent adhesion layer 10 may be precured by, for example, by applying ultraviolet (UV) light to the transparent adhesion layer 10 which includes an ultraviolet (UV) curable compound. Thereby, as a result, the precured region has a higher modulus than the liquid, so as to prevent the optically clear adhesive from being smeared on the cutting part 50a of cutter 50, and an optically clear adhesive residue is also prevented from being smeared outside of the product. In addition, as a result an optically clear adhesive is provided which has a smooth incision surface.

A series of processes shown in FIG. 1 may be performed in-line, so productivity may be increased.

Hereinafter, a method of manufacturing an adhesive film according to an embodiment is described with reference to the drawings.

Figure 5:
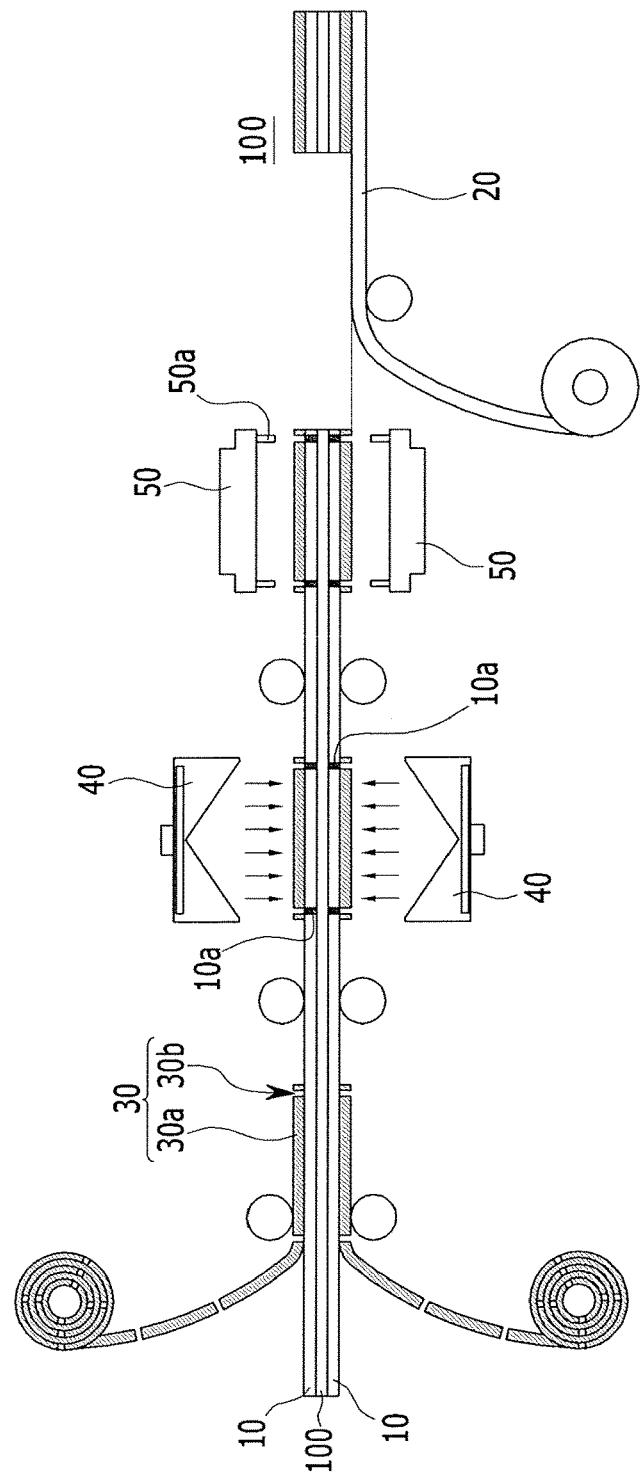
FIG. 5 is a schematic view showing a method of manufacturing an adhesive film according to an embodiment.

FIG. 5 is a schematic view showing a method of manufacturing an adhesive film according to an embodiment.

Similar to the method described in connection with FIG. 1, the method of manufacturing an adhesive film 100 according to the present embodiment includes preparing a transparent adhesion layer 10, disposing a film mask 30 including a light-transmitting region 30b and a light-shielding region 30a on a surface of the transparent adhesion layer 10, applying ultraviolet (UV) light to the transparent adhesion layer 10 through the film mask 30 to precure an area of the transparent adhesion layer 10 corresponding to the light-transmitting region 30b of film mask 30, and cutting the precured area 10a of transparent adhesion layer 10.

However, the method of manufacturing an adhesive film according to the present embodiment is applied to a light-shielding tape for a display device. For example, in the present embodiment, different from the method described in connection with FIG. 1, the transparent adhesion layer 10 may be prepared by, for example, laminating the optically clear adhesive on both surfaces of light-shielding substrate 110. In addition, in the present embodiment, each film mask 30 is disposed on each transparent adhesion layer 10, and each transparent adhesion layer 10 is precured and cut.

The drawing exemplifies that the process is simultaneously performed on both surfaces of light-shielding substrate 110, but exemplary embodiments are not limited thereto. For example, alternatively in an embodiment, the above-mentioned process for forming an adhesive film may first be performed on one surface of light-shielding substrate 110, and then the above-mentioned process for forming a adhesive film may subsequently be performed on the other surface of the light shielding substrate 110.

The obtained adhesive film 100 may increase the incision surface workability by including the precuring the incision surface of the optically clear adhesive during the process to increase the modulus and the hardness of the incision surface. Thereby, as a result, the optically clear adhesive may be prevented from being smeared on the incision surface 50a of cutter 50, and an optically clear adhesive residue may also be prevented from being smeared outside of the product. In addition, as a result, an optically clear adhesive may be provided having a smooth incision surface.

The adhesive film 100 may be applied to various display devices.

The display device may be, for example, a liquid crystal display (LCD), an organic light emitting diode (OLED) display, a plasma display, an electric field effect display device, an electrophoresis display device, and the like, but exemplary embodiments are not limited thereto.

The display device may include, for example, a display panel, a window positioned on one side of the display panel, and the above-described adhesive film interposed between the display panel and the window.

Hereinafter, exemplary embodiments of the present invention are illustrated in more detail with reference to examples, but exemplary embodiments are not limited thereto.

Preparation of Optically Clear Adhesive

Example 1

Into a 500 ml 4-necked flask, about 54 parts by weight of 2-ethylhexyl acrylate represented by the following Chemical Formula 1, about 34.2 parts by weight of butyl acrylate represented by the following Chemical Formula 2, and about 1.8 parts by weight of acrylic acid represented by the following Chemical Formula 3 were added as a monomer, and added with a mixed solvent of about 54 parts by weight of toluene, about 67.5 parts by weight of ethylacetate, and about 13.5 parts by weight of methanol as a solvent. About 0.9 parts by weight of AIBN (azobisisobutyronitrile) represented by the following Chemical Formula 4 was added thereto as a thermo-initiator. Subsequently, the mixture was reacted at about 60° C. for about 3 hours to prepare acrylic copolymer.

Subsequently, about 3 parts by weight of trimethylolpropane triacrylate (TMPTA) represented by the following Chemical Formula 5, about 1 part by weight of 1,6-hexanediol diacrylate (HDDA) represented by the following Chemical Formula 6, and about 6 parts by weight of hexa-functional urethane acrylate oligomer represented by the following Chemical Formula 7 were added into the acryl copolymer and added with about 0.1 part by weight of hydroxy dimethyl acetophenone (Darocur 1173) represented by the following Chemical Formula 8 as a photo-initiator to prepare an optically clear adhesive.

[Chemical Formula 1]

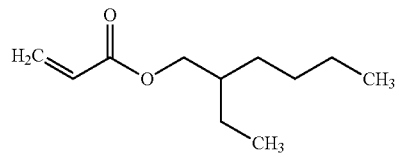

[Chemical Formula 2]

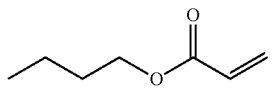

[Chemical Formula 3]

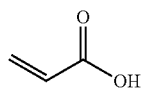

[Chemical Formula 4]

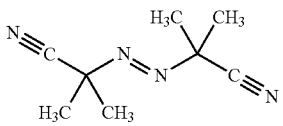

[Chemical Formula 5]

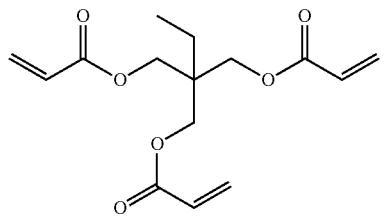

[Chemical Formula 6]

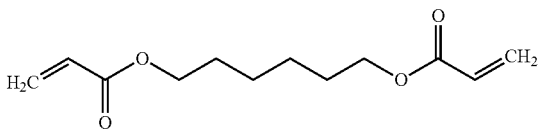

[Chemical Formula 7]

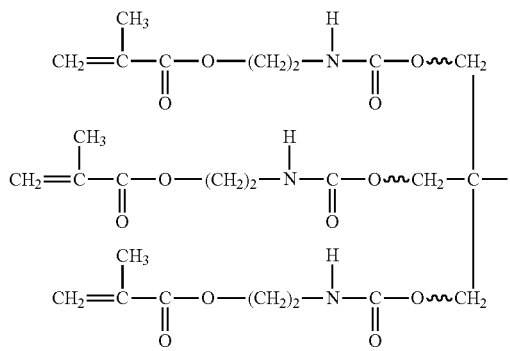
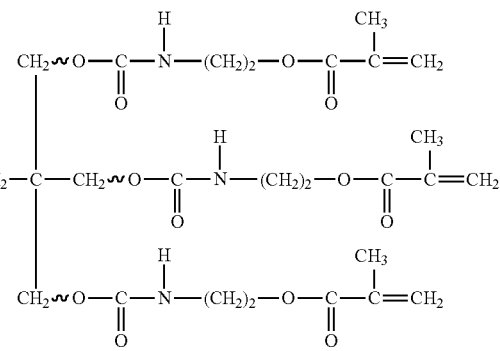

[Chemical Formula 8]

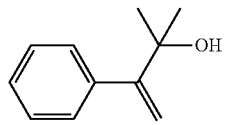

Example 2

Into a 500 ml of 4-necked flask, about 48 parts by weight of 2-ethylhexyl acrylate represented by above Chemical Formula 1, about 30.4 parts by weight of butyl acrylate represented by above Chemical Formula 2, and about 1.6 parts by weight of acrylic acid represented by above Chemical Formula 3 were added as a monomer, and added with a mixed solvent of about 48 parts by weight of toluene, about 60 parts by weight of ethylacetate, and about 12 parts by weight of methanol as a solvent. About 0.8 parts by weight of AIBN represented by above Chemical Formula 4 was added thereto as a thermo-initiator. Subsequently, the mixture was reacted at about 60° C. for about 3 hours to prepare an acrylic copolymer.

Subsequently, about 6 parts by weight of trimethylolpropane triacrylate (TMPTA) represented by above Chemical Formula 5, about 2 part by weight of 1,6-hexanediol diacrylate (HDDA) represented by above Chemical Formula 6, and about 12 parts by weight of hexa-functional urethane acrylate oligomer represented by above Chemical Formula 7 were added into the acrylic copolymer and added with about 0.2 part by weight of hydroxy dimethyl acetophenone represented by above Chemical Formula 8 as a photo-initiator to prepare an optically clear adhesive.

Example 3

Into a 500 ml of 4-necked flask, about 42 parts by weight of 2-ethylhexyl acrylate represented by above Chemical Formula 1, about 26.6 parts by weight of butyl acrylate represented by above Chemical Formula 2, and about 1.4 parts by weight of acrylic acid represented by above Chemical Formula 3 were added as a monomer; and added with a mixed solvent of about 42 parts by weight of toluene, about 52.5 parts by weight of ethylacetate, and about 10.5 parts by weight of methanol as a solvent. About 0.7 parts by weight of AIBN represented by above Chemical Formula 4 was added thereto as a thermo-initiator. Subsequently, the mixture was reacted at about 60° C. for about 3 hours to prepare an acrylic copolymer.

Subsequently, about 9 parts by weight of trimethylolpropane triacrylate (TMPTA) represented by above Chemical Formula 5, about 3 part by weight of 1,6-hexanediol diacrylate (HDDA) represented by above Chemical Formula 6, and about 18 parts by weight of hexa-functional urethane acrylate oligomer represented by above Chemical Formula 7 were added into the acrylic copolymer and added with about 0.3 part by weight of hydroxy dimethyl acetophenone represented by above Chemical Formula 8 as a photo-initiator to prepare an optically clear adhesive.

Comparative Example 1

Into a 500 ml of 4-necked flask, about 60 parts by weight of 2-ethylhexyl acrylate represented by above Chemical Formula 1, about 38 parts by weight of butyl acrylate represented by above Chemical Formula 2, and about 2 parts by weight of acrylic acid represented by above Chemical Formula 3 were added as a monomer, and added with a mixed solvent of about 60 parts by weight of toluene, about 75 parts by weight of ethylacetate, and about 15 parts by weight of methanol as a solvent. About 1 part by weight of AIBN represented by above Chemical Formula 4 was added thereto as a thermo-initiator. Subsequently, the mixture was reacted at about 60° C. for about 3 hours to prepare an acrylic copolymer.

Evaluation

Evaluation 1

The optically clear adhesives according to Examples 1 to 3 and Comparative Example 1 were measured for the storage modulus before ultraviolet (UV) curing.

The storage modulus was measured using ARES and a parallel plate by changing the temperature in a rotational shear mode.

Figure 6:
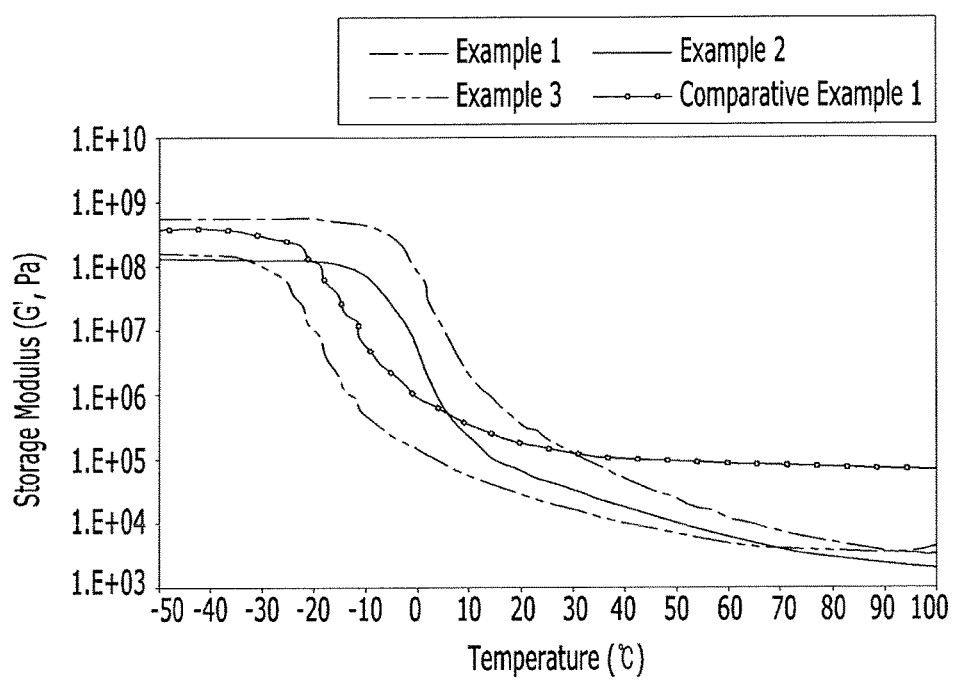
FIG. 6 is a graph showing a storage modulus of optically clear adhesives according to Examples 1 to 3 and Comparative Example 1 before ultraviolet (UV) curing.

The results are shown in FIG. 6.

FIG. 6 is a graph showing a storage modulus of optically clear adhesives according to Examples 1 to 3 and Comparative Example 1 depending upon the temperature before the ultraviolet (UV) curing.

Referring to FIG. 6, it is confirmed that the optically clear adhesives according to Examples 1 to 3 had lower storage modulus compared to the optically clear adhesive according to Comparative Example 1 and had higher fluidity as increasing the relative content of UV curable material. From the results, it is understood that the optically clear adhesives according to Examples 1 to 3 increased wettability so that the bubble generation may be reduced in a window glass including print steps.

Evaluation 2

The optically clear adhesives according to Examples 1 to 3 were measured for the storage modulus change after ultraviolet (UV) curing.

The storage modulus was measured using ARES and a parallel plate by changing the temperature in a rotational shear mode.

Figure 7:
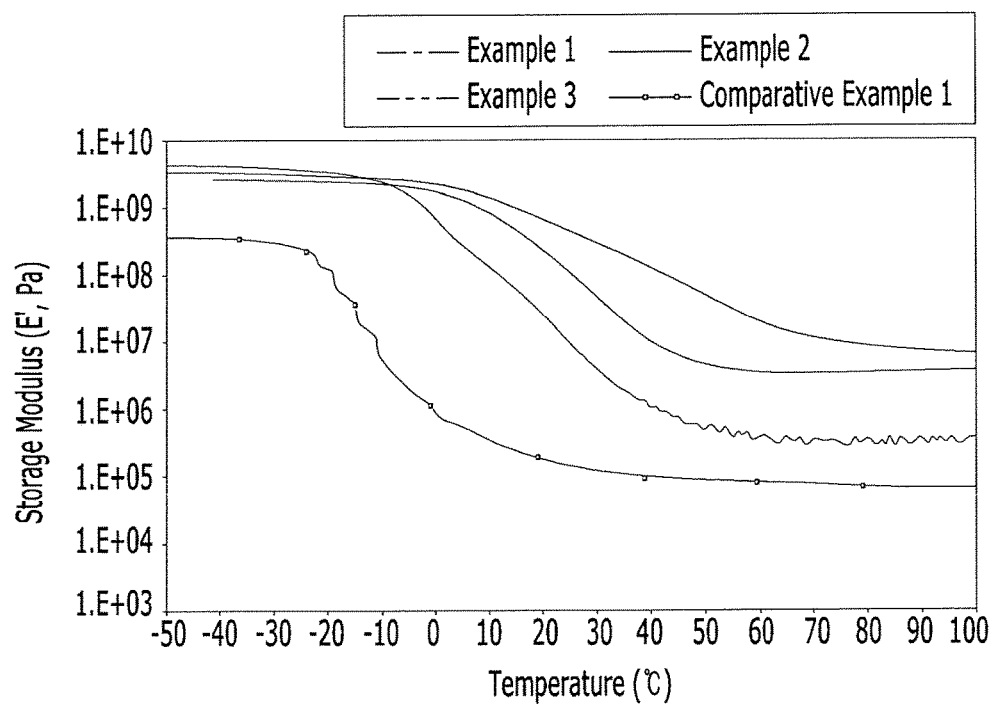
FIG. 7 is a graph showing a storage modulus of optically clear adhesives according to Examples 1 to 3 and Comparative Example 1 after ultraviolet (UV) curing.

The results are shown in FIG. 7.

FIG. 7 is a graph showing a storage modulus change of optically clear adhesives according to Examples 1 to 3 and Comparative Example 1 after the ultraviolet (UV) curing.

Referring to FIG. 7, it is understood that the storage modulus was increased compared to the general transparent double-sided adhesive after UV curing. From the results, it is understood that the optically clear adhesive according to Examples 1 to 3 increased the cross-linking degree after ultraviolet (UV) curing, so that the reliability characteristics may be increased after assembling the window glass.

On the other hand, the following Table 2 shows the plateau storage modulus and the cross-linking molecular weight of optically clear adhesives according to Examples 1 to 3 before and after ultraviolet curing.

The cross-linking molecular weight may be calculated according to the following Calculation Equation.

$$G_N^0 = \frac{\rho RT}{M_c} \quad \text{[Calculation Equation]}$$

$G_N^0$: rubbery plateau modulus, $\rho$: density, T: absolute temperature, R: gas constant, Mc: Molecular weight between the crosslinkers

TABLE 1

|  | $\rho$(g/cm$^3$) | $G_N^0$ Pa | | Mc (g/mol) | |
| --- | --- | --- | --- | --- | --- |
|  |  | Before UV curing | After UV curing | Before UV curing | After UV curing |
| Example 1 | 1.05 | 1.7E04 | 3.2E05 | 164,600 | 9,720 |
| Example 2 | 1.06 | 7.7E03 | 3.3E06 | 373,500 | 960 |
| Example 3 | 1.06 | 5.9E03 | 7.5E06 | 490,800 | 420 |

Referring to Table 1, it is confirmed that, in the optically clear adhesives according to Examples 1 to 3, the storage modulus was rapidly increased after ultraviolet (UV) curing. Particularly, as increasing the content of ultraviolet (UV) curable compound, the storage modulus of optically clear adhesive was decreased before ultraviolet (UV) curing, but the storage modulus of optically clear adhesive was even further increased after ultraviolet (UV) curing. It is understood that the ultraviolet (UV) curable compound acted as a diluent in the optically clear adhesive before ultraviolet (UV) curing. On the other hand, the optically clear adhesive was more cross-linked to increase the storage modulus after ultraviolet curing.

Evaluation 3

Figure 8A:
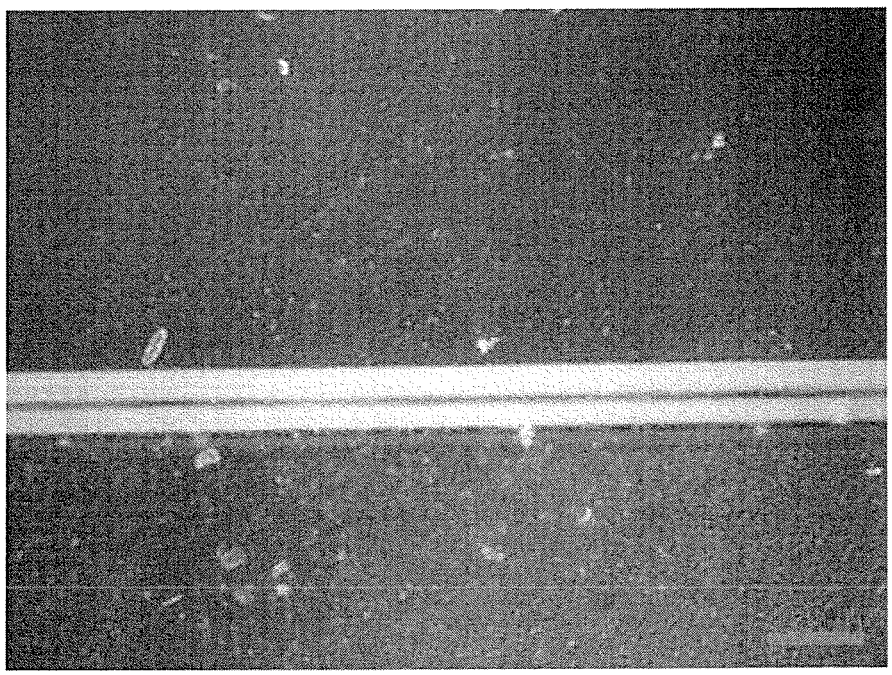
FIG. 8A is a photograph showing a punched incision surface of an optically clear adhesive according to Example 1 before ultraviolet (UV) curing.
Figure 8B:
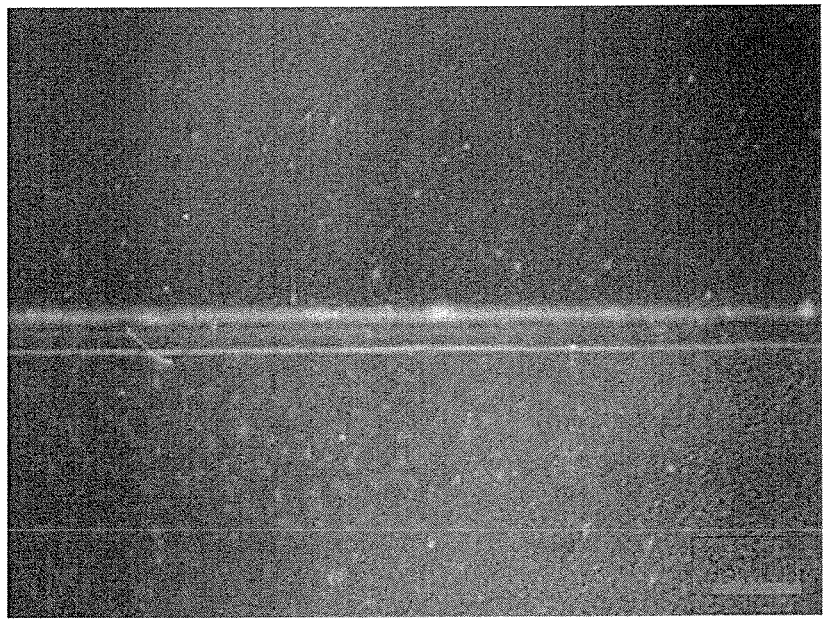
FIG. 8B is a photograph showing a punched incision surface of the optically clear adhesive according to Example 1 after ultraviolet (UV) curing.
Figure 9A:
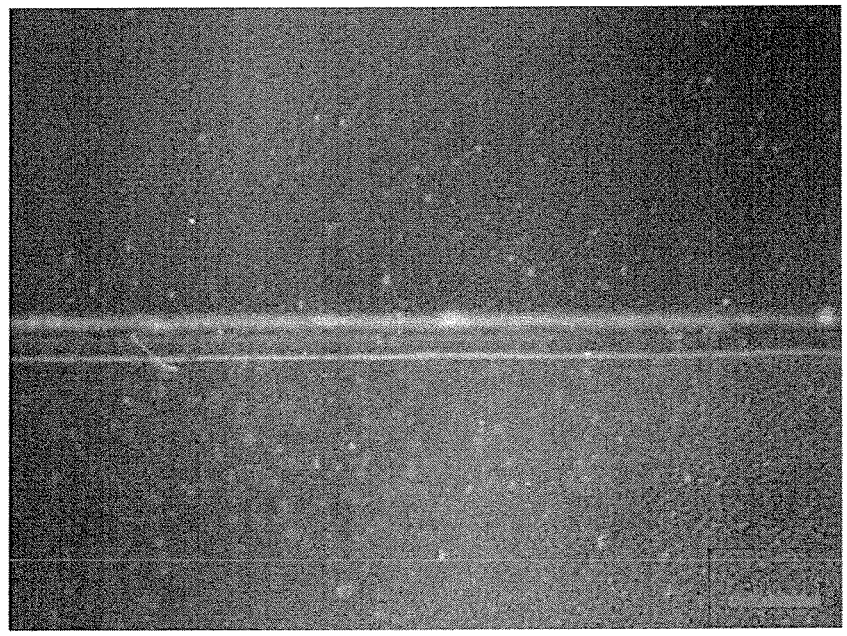
FIG. 9A is a photograph showing a punched incision surface of an optically clear adhesive according to Example 2 before ultraviolet (UV) curing.
Figure 9B:
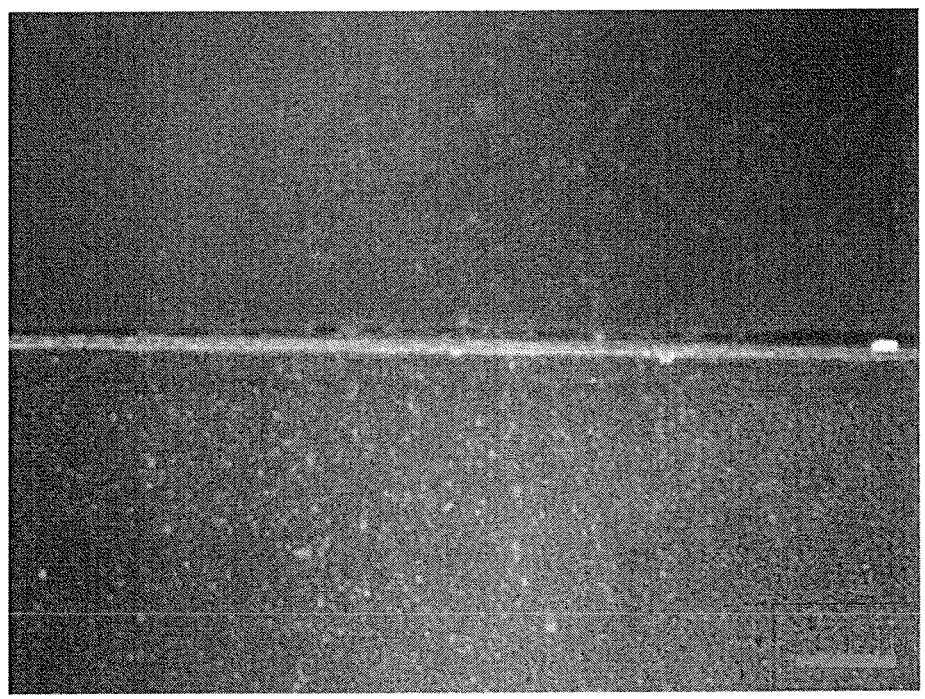
FIG. 9B is a photograph showing a punched incision surface of the optically clear adhesive according to Example 2 after ultraviolet (UV) curing.
Figure 10A:
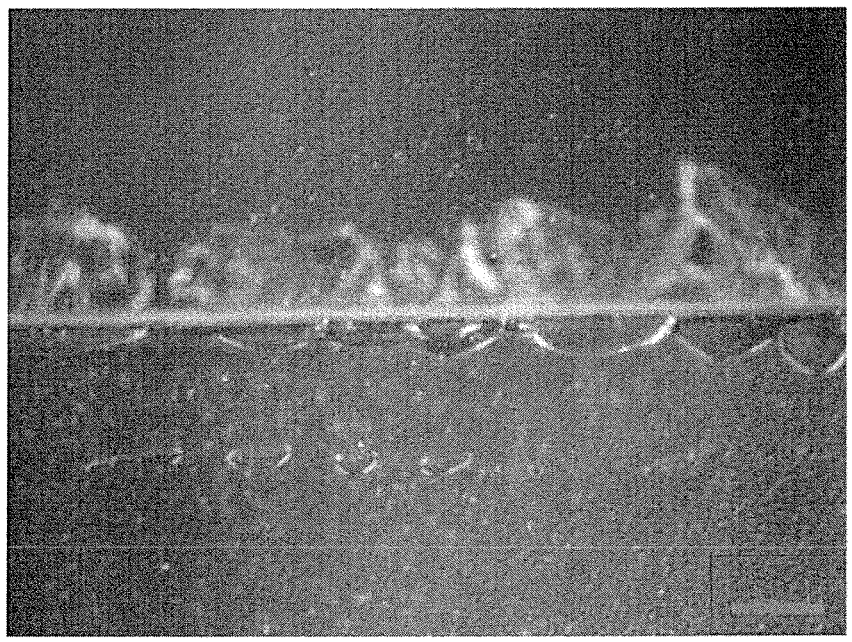
FIG. 10A is a photograph showing a punched incision surface of an optically clear adhesive according to Example 3 before ultraviolet (UV) curing.
Figure 10B:
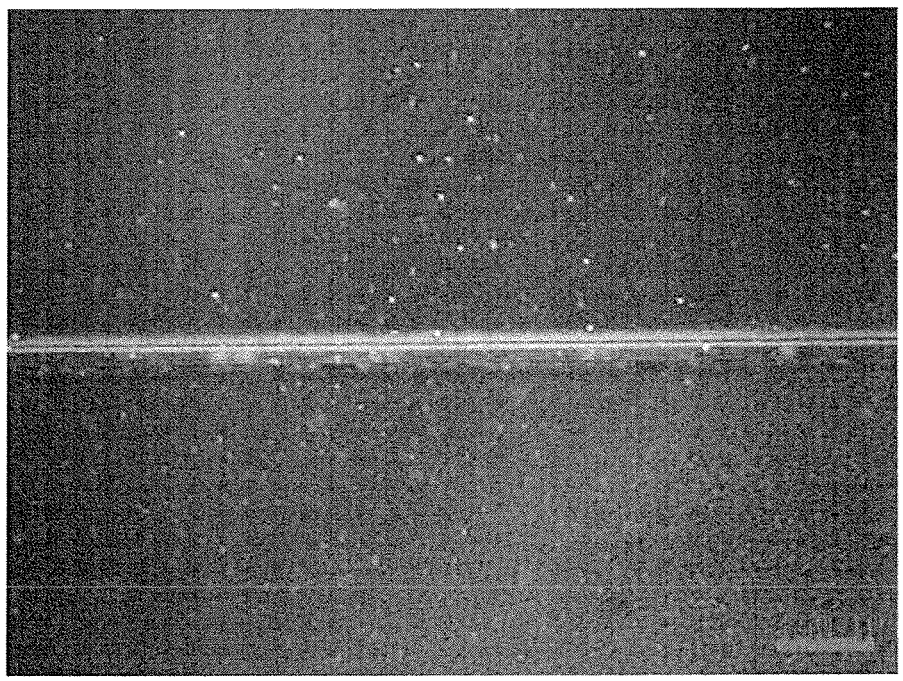
FIG. 10B is a photograph showing a punched incision surface of the optically clear adhesive according to Example 3 after ultraviolet (UV) curing.

FIG. 8A is a photograph showing a punched incision surface of an optically clear adhesive according to Example 1 before ultraviolet (UV) curing. FIG. 8B is a photograph showing a punched incision surface of the optically clear adhesive according to Example 1 after ultraviolet (UV) curing. FIG. 9A is a photograph showing a punched incision surface of an optically clear adhesive according to Example 2 before ultraviolet (UV) curing. FIG. 9B is a photograph showing a punched incision surface of the optically clear adhesive according to Example 2 after ultraviolet (UV) curing. FIG. 10A is a photograph showing a punched incision surface of an optically clear adhesive according to Example 3 before ultraviolet (UV) curing. FIG. 10B is a photograph showing a punched incision surface of the optically clear adhesive according to Example 3 after ultraviolet (UV) curing.

Referring to FIG. 8A to FIG. 10B, it is confirmed that the optically clear adhesives according to Examples 1 to 3 were clearly cut on the punched surface thereof after ultraviolet (UV) curing.

Having described exemplary embodiments of the present invention, it is further noted that it is readily apparent to those of ordinary skill in the art that various modifications may be made without departing from the spirit and scope of the invention which is defined by the metes and bounds of the appended claims

What is claimed is:

1. A method of manufacturing an adhesive film comprising:
preparing a transparent adhesion layer in a state having a storage modulus of about $10^3$ Pa to about $10^6$ Pa at room temperature;
disposing a film mask including a light-transmitting region and a light-shielding region on the transparent adhesion layer in the state having a storage modulus of about $10^3$ Pa to about $10^6$ Pa at room temperature;
applying ultraviolet (UV) light to the transparent adhesion layer in the state having a storage modulus of about $10^3$ Pa to about $10^6$ Pa at room temperature through the film mask to precure an area of the transparent adhesion layer corresponding to the light-transmitting region of the film mask into a state having a storage modulus of no less than about $10^6$ Pa; and only cutting within the precured area of the transparent adhesion layer in the state having a storage modulus of no less than about $10^6$ Pa.

2. The method of claim 1, wherein the film mask comprises a light-blocking printed layer and a release layer formed on the transparent adhesion layer, and wherein the light-blocking printed layer is formed on all areas of the transparent adhesion layer except for a place corresponding to the area where the transparent adhesion layer is to be cured.

3. The method of claim 2, wherein the place corresponding to the area where the transparent adhesion layer is to be cured is formed with a closed curved line.

4. The method of claim 1, wherein the preparing of the transparent adhesion layer comprises: laminating the optically clear adhesive in the state having a storage modulus of about $10^3$ Pa to about $10^6$ Pa at room temperature.

5. The method of claim 4, wherein the optically clear adhesive comprises:
an acrylic copolymer obtained from a composition including a solution-polymerizable acryl compound and a reaction initiator, and
an ultraviolet (UV) curable compound.

6. The method of claim 5, wherein the solution-polymerizable acryl compound comprises at least one selected from the group consisting of an acrylic acid, 2-ethylhexyl acrylate, 2-methylbutyl acrylate, isooctyl acrylate, lauryl acrylate, ethyl acrylate, butyl acrylate, hexyl acrylate, octyl acrylate, decyl acrylate, and isodecyl acrylate.

7. The method of claim 6, wherein the solution-polymerizable acryl compound comprises:
about 30 to about 60 wt % of butyl acrylate,
about 30 to about 60 wt % of 2-ethylhexyl acrylate, and
about 0.1 to about 40 wt % of acrylic acid.

8. The method of claim 5, wherein the reaction initiator comprises at least one selected from the group consisting of benzoylperoxide, acetyl peroxide, dilauryl peroxide, hydrogen peroxide, potassium persulfonate, and 2,2'-azobisisobutyronitrile.

9. The method of claim 5, wherein the ultraviolet (UV) curable compound comprises at least one selected from the group consisting of caprolactone acrylate, 1,6-hexanediol diacrylate, trimethylolpropane triacrylate, pentaerythritol triacrylate, lauryl acrylate, urethane acrylate, epoxy acrylate, polyester acrylate, and silicon acrylate.

10. The method of claim 9, wherein the ultraviolet (UV) curable compound comprises about 5 to about 50 wt % of trimethylolpropane triacrylate, about 5 to about 50 wt % of multi-functional urethane acrylate, and about 5 to about 50 wt % of 1,6-hexadiol diacrylate.

11. The method of claim 5, wherein the optically clear adhesive further comprises a photoinitiator.

12. The method of claim 5, wherein the acrylic copolymer and the ultraviolet (UV) curable compound are included at a weight ratio of about 70:30 to about 95.5:0.5.

13. The method of claim 1, wherein the disposing of the film mask, the precuring of the transparent adhesion layer, and the cutting of the precured area of the transparent adhesion layer in the state having a storage modulus of no less than about $10^6$ Pa are performed in an in-line process.

* * * * *